(12) United States Patent
Cottrell (10) Patent No.: US 9,753,140 B2
(45) Date of Patent: Sep. 5, 2017

(54) METHODS AND APPARATUS FOR IMAGING IN SCATTERING ENVIRONMENTS

(71) Applicant: RAYTHEON COMPANY, Waltham, MA (US)

(72) Inventor: William Cottrell, Melrose, MA (US)

(73) Assignee: RAYTHEON COMPANY, Waltham, MA (US)

( * ) Notice: Subject to any disclaimer, the term of this patent is extended or adjusted under 35 U.S.C. 154(b) by 287 days.

(21) Appl. No.: 14/269,266

(22) Filed: May 5, 2014

(65) Prior Publication Data

US 2015/0319347 A1  Nov. 5, 2015

(51) Int. Cl.
| | |
|---|---|
| *H04N 5/225* | (2006.01) |
| *G01S 17/89* | (2006.01) |
| *H04N 9/04* | (2006.01) |
| *H04N 9/64* | (2006.01) |
| *G01S 17/10* | (2006.01) |
| *G01S 17/46* | (2006.01) |
| *G01B 11/25* | (2006.01) |

(52) U.S. Cl.
CPC .............. *G01S 17/89* (2013.01); *G01B 11/25* (2013.01); *G01S 17/107* (2013.01); *G01S 17/46* (2013.01); *H04N 5/2256* (2013.01); *H04N 9/04* (2013.01); *H04N 9/64* (2013.01)

(58) Field of Classification Search
CPC .......... H04N 5/2256; H04N 9/64; H04N 9/04; G01S 17/107; G01S 17/46; G01S 17/89; G01B 11/25
USPC .......................................................... 348/81
See application file for complete search history.

(56) References Cited

U.S. PATENT DOCUMENTS

| | | | |
|---|---|---|---|
| 2006/0044546 A1* | 3/2006 | Lewin ..................... | G01S 17/46 356/4.04 |
| 2006/0233485 A1* | 10/2006 | Allen ....................... | F17D 5/00 385/13 |

(Continued)

FOREIGN PATENT DOCUMENTS

| | | |
|---|---|---|
| WO | 0225209 A1 | 3/2002 |
| WO | 2006102259 A2 | 9/2006 |

OTHER PUBLICATIONS

Caimi et al. "Underwater Imaging and Optics: Recent Advances". Oceans 2008, pp. 1-9.*

(Continued)

*Primary Examiner* — Zhihan Zhou
(74) *Attorney, Agent, or Firm* — Lando & Anastasi, LLP (57) ABSTRACT

Systems and method for imaging through scattering media. One example of an imaging system includes an illuminator configured to produce a structured illumination pattern and to direct the structured illumination pattern into an imaging field through a scattering medium, a camera configured to receive reflections of the structured illumination pattern from an object in the imaging field and to provide corresponding image data, a master oscillator coupled to the illuminator and to the camera and configured to modulate the structured illumination pattern and to clock the camera so as to time gate the reflections of the structured illumination pattern and provide signal timing data, and a processor coupled to the camera and received to receive and process the image data and the signal timing data to produce an image of the object.

15 Claims, 3 Drawing Sheets

(56) References Cited

U.S. PATENT DOCUMENTS

| | | | | |
|---|---|---|---|---|
| 2012/0320219 A1* | 12/2012 | David | ............... | G01S 7/483 348/169 |
| 2013/0088723 A1* | 4/2013 | Feldkhun | ........... | G01B 9/02082 356/498 |
| 2013/0128042 A1* | 5/2013 | Bridge | .............. | H04N 5/232 348/143 |
| 2013/0215235 A1* | 8/2013 | Russell | ............ | H04N 13/0203 348/47 |
| 2013/0342674 A1* | 12/2013 | Dixon | ................ | G02B 21/36 348/79 |

OTHER PUBLICATIONS

Chang et al. "Improving visibility depth in passive underwater imaging by use of polarization". Applied Optics, vol. 42, No. 15. May 2003, pp. 2794-2803.*

D'Andrea et al. "Structured illumination and time gated detection for diffuse optical imaging". ECBO: SPIE-OSA/ vol. 7369. 2009, pp. 1-7.*

Legare et al. "The Role of Backscattering in SHG Tissue Imaging". Biophysical Journal, vol. 93. Aug. 2007, pp. 1312-1320.*

Narasimhan et al. "Structured Light Methods for Underwater Imaging: Light Stripe Scanning and Photometric Stereo". Proceedings of 2005 MTS/IEEE Oceans. Sep. 2005, pp. 1-8.*

Schwarz et al. "Time-of-Flight Imaging". 3D Computer Vision II. Dec. 2010, pp. 1-47.*

He et al. "Optical image sensing through turbid water". Third Intl. Conf. on Experimental Mechanics and Third Conf. of the Asian Committee on Experimental Mechanics, 2005, edited by Quan, Chau, Asundi, Wong, Lim, Proc. of SPIE vol. 5852, pp. 74-79.*

Cave Projects: "Structured Light in Scattering Media," <http://www.cs.columbia.edu/CAVE/projects/struc_light/>, retrieved from the Internet on Mar. 27, 2014.

* cited by examiner

METHODS AND APPARATUS FOR IMAGING IN SCATTERING ENVIRONMENTS

BACKGROUND

Optical imaging through turbid (e.g., cloudy) water results in poor signal-to-noise ratio data, compromising qualitative and quantitative analyses or requiring unacceptable operational constraints. Current solutions are technically complex and expensive, limiting their ability to be used in emerging low cost architectures. For example, certain conventional systems use Light Distancing and Ranging (LIDAR) which excludes out-of-object-plane light using time gating. However, such systems are generally large and expensive, and do not provide color-corrected images. Other approaches involve placing the optical sensor close to the object being imaged, which reduces the impact of scattering exponentially. However, for many applications requiring close-range imaging is undesirable and potentially risky. Some approaches focus on image processing to "clean up" images with scattering effects, but have limited ability to improve image quality. Photonic mixing devices (PMDs) also enable time of flight measurements for range finding applications. A light source is modulated at a frequency in the range of 1 MHz to 1 GHz. The light illuminates a scene, and part of the reflected light enters the range finder camera. By measuring in each pixel the phase of the incident light, a distance can be estimated between the pixel and its conjugate (light-reflecting) pixel area in the scene. In this way the distances of objects and shape of objects can be estimated and recorded. As opposed to some externally mixed schemes, a PMD mixes the incident light immediately in the detector, instead of in a connected electronic mixer. As a result, low noise may be achieved, and often a better signal to noise ratio and a smaller error on the estimated distance.

SUMMARY OF INVENTION

As discussed above, conventional technologies for imaging through scattering media in either air or water are expensive and/or complex and have limited success. Additionally, conventional systems do not provide color images of the object. Accordingly, a need exists for a relatively small, inexpensive imaging system capable of providing high quality color images in turbid marine environments in a stand-off geometry.

According to one embodiment, an imaging system comprises an illuminator configured to produce a structured illumination pattern and to direct the structured illumination pattern into an imaging field, a camera configured to receive reflections of the structured illumination pattern from an object in the imaging field and to provide corresponding image data, a master oscillator coupled to the illuminator and to the camera and configured to modulate the structured illumination pattern and to clock the camera so as to time gate the reflections of the structured illumination pattern and provide signal timing data, and a processor coupled to the camera and received to receive and process the image data and the signal timing data to produce an image of the object.

In one example, the camera includes an array of imaging pixels, each pixel including a photosensitive detector configured to receive the reflections of the structured illumination pattern and to produce the image data, and a phase meter coupled to the master oscillator. In one example, the illuminator is configured to produce the structured illumination pattern having a wavelength in the green region of the visible spectrum. In another example, the structured illumination pattern includes an array of dots. The processor may be further configured to determine a scattering coefficient of a scattering medium through which the structured illumination pattern and the reflections of the structured illumination pattern travel based on analysis of the image data. In one example, the system further includes at least one RGB camera coupled to the processor and configured to produce an RGB image of the object. The processor may be further configured to analyze the image data to obtain an estimated range between the object and the camera, and to overlay the estimated range with the RGB image to produce the image of the object. In one example, the system further includes a narrowband filter coupled to the at least one RGB camera and configured to exclude the reflections of the structured illumination pattern from being received by the at least one RGB camera.

According to another embodiment, a method of imaging an object in a scattering medium comprises acts of generating a time-modulated structured illumination pattern, illuminating the object with the time-modulated structured illumination pattern, receiving a reflected signal at an imaging sensor, the reflected signal including reflections of the structured illumination pattern from the object and backscatter from the scattering medium, collecting spatially resolved range-gated image data by time gating the reflected signal to exclude the backscatter, and processing the image data to produce an image of the object.

In one example, the act of generating the time-modulated structured illumination pattern includes modulating an illumination source using a master oscillator, and the act of time gating the reflected signal includes clocking the imaging sensor using the master oscillator. In another example, the method further includes producing a passive illumination RGB image of the object. In one example, the act of processing the image data includes extracting spatial backscatter signatures from the image data, and determining a scattering coefficient of the scattering medium. In one example, the act of extracting the spatial backscatter signatures from the image data includes measuring a signal strength of the backscatter. The method may further include correcting the RGB image of the object using the scattering coefficient to produce a corrected image of the object. In one example, the act of processing the image data includes determining an estimated range to the object and a shape of the object; and further comprising overlaying the estimated range with the RGB image to produce the image of the object. In another example, the act of producing the RGB image is performed using an RGB camera, and further comprising filtering the RGB camera to exclude the reflections of the structured illumination pattern. In another example, the act of generating the time-modulated structured illumination pattern includes generating the time-modulated structured illumination pattern having a wavelength in the green region of the visible spectrum.

According to another embodiment, an imaging system comprises an illuminator configured to produce an illumination beam having a wavelength in the green region of the visible spectrum and to direct the illumination beam into an imaging field, a camera configured to receive reflections of the illumination beam from an object in the imaging field and to provide corresponding image data, a master oscillator coupled to the illuminator and to the camera and configured to modulate the illumination beam and to clock the camera so as to time gate the reflections of the illumination beam and provide signal timing data, and a processor coupled to the camera and received to receive and process the image data and the signal timing data to produce an image of the object.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Near-object underwater inspection is an area of increasing interest for several applications, including in mine clearance with unmanned underwater vehicles (UUV). These and other underwater imaging systems typically include a single visible-spectrum optical sensor. As discussed above, one challenge to the successful use of these optical sensors results from the turbidity or cloudiness of the water. General sources of turbidity generally include small particulates, microscopic marine fauna and flora and other suspended particles in the water column. Light that is scattered from the entire volume of water (referred to herein as "out-of-plane scatter") creates poor signal-to-noise ratio (S/N) optical images, or requires that the sensor be proximal to the object being inspected. These are challenges to both qualitative and quantitative analysis and characterization of underwater objects.

Accordingly, aspects and embodiments are directed to systems and methods for imaging objects through a moderately scattering medium, such as turbid water, for example. In particular, certain embodiments are directed to short to mid-range optical imaging in turbid marine environments, including the use of modified commercial off-the-shelf (MOTS) sensors to exclude out-of-plane optical scatter. As discussed in more detail below, time-of-flight (TOF) processing may be used to exclude light that is scattered out of the object plane and would otherwise degrade the image. This processing can be principally used to reduce or remove backscattered signal from objects. Additionally, the TOF processing may be combined with polarization or other methods to reduce the lesser effects of forward scattering image noise. This approach includes the use of a TOF camera (imaging detector or sensor) that may be modified for use in marine environments. In addition, a structured illumination pattern may be projected onto the target object, and image processing may be used to extract image boundaries, distance and other information by monitoring changes to that pattern. A standard image overlay may be made, and additional image processing can be used to provide a final image. This approach may also include the use of a MOTS sensor, as discussed further below. Certain embodiments may implement TOF processing alone, or structured illumination (SI) alone, while other embodiments may implement a combination of the two techniques, as discussed further below. Additionally, embodiments of the imaging system may be configured to extract scattering information directly from the scattering medium, allowing for further image processing, as also discussed below. The underlying imaging sub-systems used in each approach may include red-green-blue (RGB) cameras, a ranging sensor, an illumination source, and associated electronics. Such sub-systems are available at low cost due to high-volume manufacture for existing commercial applications. Accordingly, aspects and embodiments implementing these approaches may leverage high-volume and low cost COTS items (e.g., sensors and illuminators) to provide an affordable solution for quality underwater imaging.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
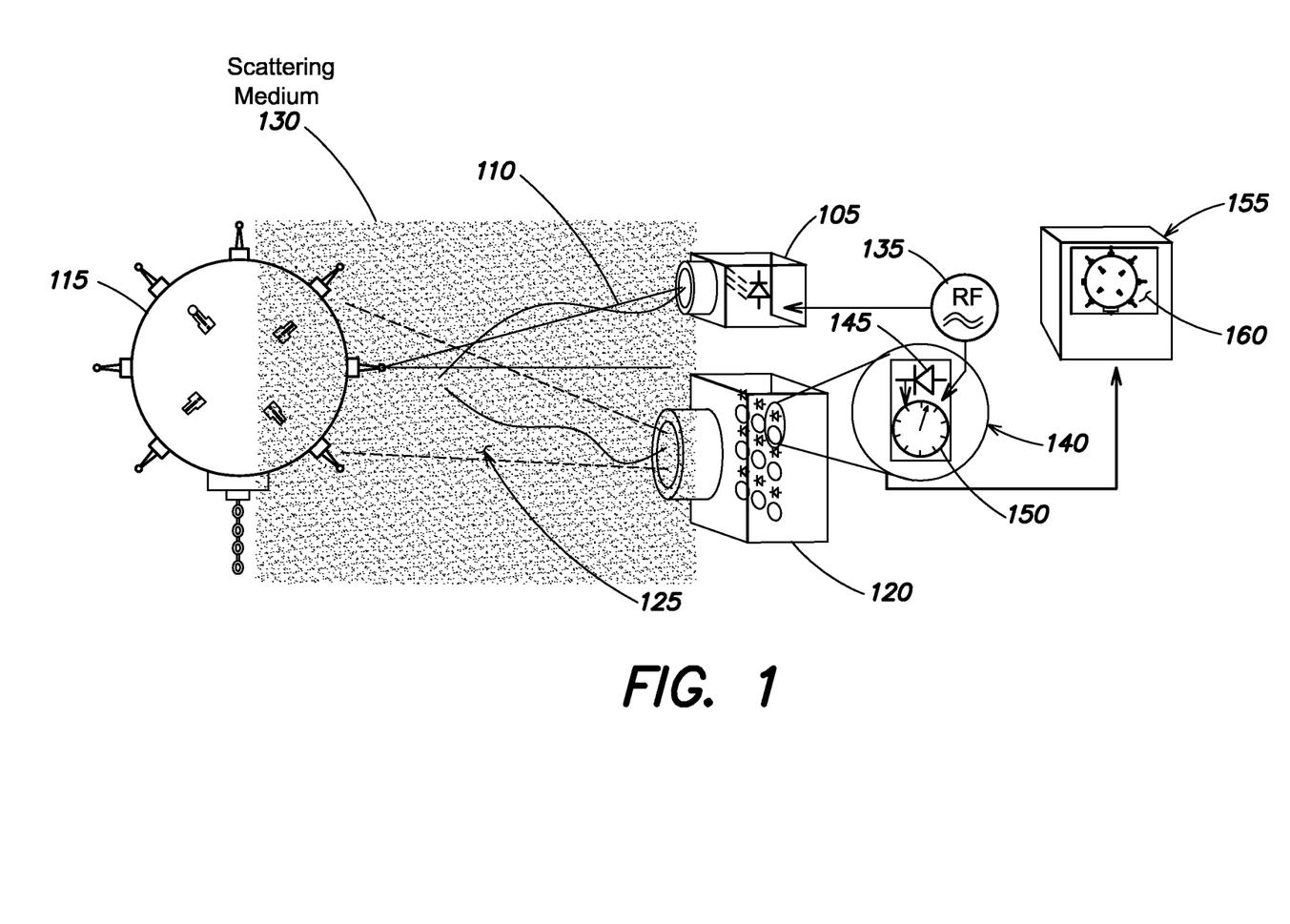
FIG. 1 is a functional block diagram of one example of an imaging system configured to implement time-of-flight processing according to aspects of the invention.

Referring to FIG. 1, there is illustrated a functional block diagram of one example of an imaging system based on TOF processing, according to certain aspects. The system includes an illuminator 105 that generates an illumination beam 110 which may be directed towards an object 115. The system further includes a camera 120 that receives reflected photons 125 from the object 115. The illumination beam 110 and reflected beam 125 traverse a scattering medium 130, such as turbid water, for example, between the system and the object 115. As discussed above, in a TOF system, photons received at the imaging sensor (camera 120) are time gated, which provides ability to slice the resulting image data to access the z-direction information (distance from the camera 120), and thereby exclude contributions from scattered reflections which fall outside of the selected time gate. As discussed further below, time gating may be achieved by modulating the illumination beam 110 using a master oscillator 135 coupled to the illuminator 105. In one example, the master oscillator 135 is an RF source, producing a master signal having a frequency of about 20 MHz, for example. The camera 120 is clocked to the master oscillator 135, as shown in FIG. 1, such that timing information about the signal 125 is collected. In one example, the camera 120 is a solid state camera. In one embodiment, the camera 120 includes an array of pixels 140. Each pixel 140 may include a photo-diode (or other photo-sensitive detector) 145, along with an RF phase meter 150 that is used for timing information, as discussed further below.

The illuminator 105 may include an LED or laser diode, for example, that produces a beam having a desired wavelength. Illumination sources commonly used in other applications (e.g., laser range-finding) typically produce beams having a wavelength in the infrared spectral region (e.g., approximately 900+ nm). However, optical absorption in water is almost complete at infrared wavelengths, even over short distances, making it virtually impossible to perform underwater stand-off imaging at these wavelengths. According to certain embodiments, the illuminator 105 is modified, relative to standard conventional illumination sources, to produce the illumination beam 110 having a wavelength suitable for underwater imaging, for example, a wavelength in the green region of the visible spectrum (e.g., in the range of approximately 520-570 nm). According to Beer's law, a 2 meter (m) total path length through water, corresponding to a separation of 1 m between the illuminator 105 and the object 115, results in approximately a 20% reduction in optical power due to absorption for the green region of the spectrum. In contrast, for the near-infrared (NIR) spectral region, optical absorption is approximately 90% over the same path length.

Thus, using modulated active illumination having a wavelength appropriately selected for the scattering medium, a modified TOF system provides the ability to slice the resulting image data to access the z-direction (distance from the camera 120), and enables the exclusion of photons that are scattered out of the object plane and would otherwise degrade the image. Back-end signal processing may be used to derive the correct slice of the image (similar to multipath rejection processing, for example), as will be appreciated by those skilled in the art, given the benefit of this disclosure. The signal processing may be performed by a processor/controller 155 coupled to or integrated with the camera 120 and that receives the image data from the camera 120. In some examples, the time gating may be applied directly using knowledge of the range to the object 115, as discussed further below. Provided that sufficient signal 125 is received by the camera 120, which should be the case for a representative marine environment, the TOF technique may be used to provide an image substantially free from the effects of scattering. The image may be displayed on a display 160. In the example illustrated in FIG. 1, the display 160 is shown integrated with the controller 155; however, in other examples the display 160 may be separate from and coupled to the controller.

Figure 2:
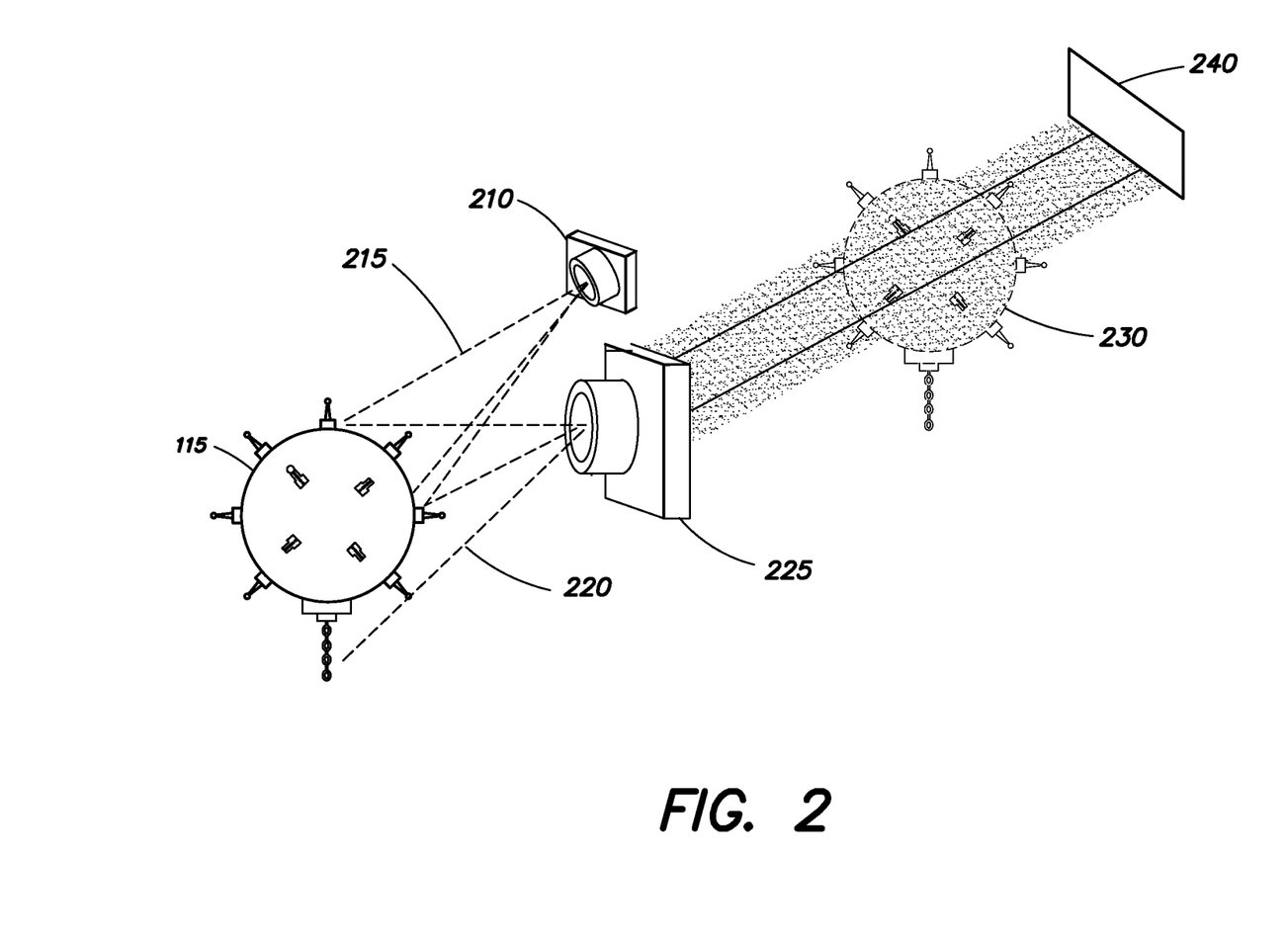
FIG. 2 is a functional block diagram of one example of an imaging system configured to implement structured illumination according to aspects of the invention.

In some embodiments, the imaging system may be further configured to implement structured illumination, in which the illumination beam is replaced with a structured illumination pattern, such as an array of bright dots, for example. Structured illumination may be used alone to provide information about the object 115, or in combination with TOF processing to provide enhanced imaging of the object. FIG. 2 illustrates a functional block diagram of one example of an imaging system configured to implement structured illumination. In such a system, an illuminator 210 is configured to project an illumination pattern 215 into the imaging field and onto the object 115. As in the case of the TOF system discussed above, in certain embodiments, the illuminator 210 may be modified to emit the illumination pattern at a wavelength suitable for underwater imaging, for example, in the blue or green region of the visible spectrum. Image processing is used to extract image boundaries, distance and other information by monitoring changes to that pattern in light 220 reflected from the object 115. For example, a camera 225 may image the size, distortion and location of the bright spots, and determine the range to the object 115 using back-end processing, as discussed further below. In one example, in which structured illumination is used to provide range information, the camera 225 may be configured to measure the distance the light 220 travels to each pixel within the imaging sensor of the camera, and thereby determine the range to the object 115. Embedded imaging software may used to process the image data obtained from the camera 225 and produce an image 230 of the object 115, which may be displayed on a display 240.

According to certain embodiments, aspects of TOF and structured illumination may be combined to provide an imaging system with improved overall performance for short to mid-range optical imaging through a moderately scattering medium, such as turbid water, for example. For example, a combined system may include an illuminator configured to project a modulated structured illumination pattern in a suitable wavelength range (for example, in the blue and/or green region of the visible spectrum), and a TOF camera with associated image processing software adapted to time gate the reflected illumination pattern. The TOF function rejects out of plane scatter, providing a higher quality image, while the structured illumination function may provide fine distance resolution. Furthermore, the system may also include one or more RGB cameras used to provide additional imaging capabilities, including the option of providing a color corrected image of the object 115, as discussed further below.

Figure 3:
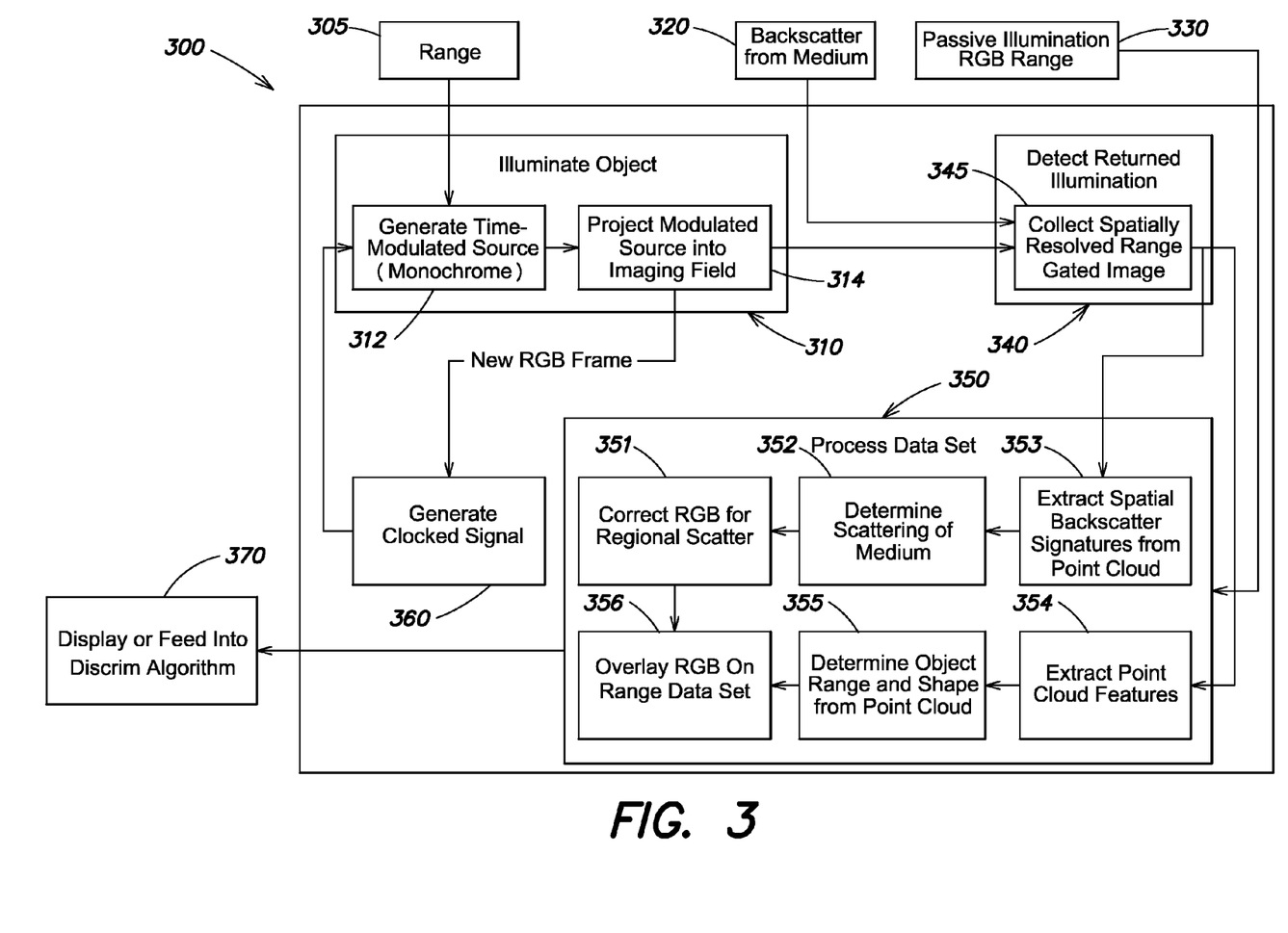
FIG. 3 is a functional block diagram of another example of an imaging system according to aspects of the invention.

Referring to FIG. 3, there is illustrated a functional block diagram of one example of an imaging method 300 according to certain embodiments. Step 310 includes illuminating an imaging field (including the object 115), which may be accomplished using an illuminator 105/210. In one example, the illuminator is configured to produce a time modulated illumination beam (step 312). For example, as discussed above with reference to FIG. 1, in one embodiment, the illuminator 105 is coupled to a master oscillator 135 that produces a clock signal (step 360) that is used to modulate the illumination beam such that the illuminator produces a time-modulated illumination beam (step 312). In one example, the illuminator is a monochrome laser illuminator, and is configured to produce the modulated illumination beam having a wavelength in the blue and/or green region of the visible spectrum. In certain examples, the modulated illumination beam may be further configured to have a structured illumination pattern, as discussed above with reference to FIG. 2.

In step 314, the modulated illumination beam is projected into the imaging field to illuminate the object 115. Returned illumination, which may include reflections of the illumination beam from the object 115 as well as backscatter from the scattering medium 130 (indicated by block 320) is collected by an imaging sensor/camera (step 340). In one embodiment, detecting the returned illumination (step 340) includes collecting spatially resolved range gated image data (step 345). Referring again to FIG. 1, in one embodiment, the RF phase meter 150 in each pixel 140 of the camera 120 is clocked by the master oscillator 135 and used to extract phase data from the received signal 125 which may be used to time gate the signal. In certain embodiments, the clocking parameters for image acquisition (with appropriate time gating) may be derived from sonar or another sensor input that provides initial range information (step 305). In certain examples, the camera 120 may include a photonic mixing device, and the RF phase meter 150 is used to measure, in each pixel, the phase of the incident light, such that a distance can be estimated between the pixel and its conjugate (light-reflecting) pixel area in the scene, as discussed above.

After the image data has been collected, the data set is processed (step 350) using image processors and software that may be embedded with the camera 120/225 or included in a separate controller coupled to the camera(s). The processed data set may be used to produce an image of the object 115 that is displayed on a display 155/240 or provided to another processor (not shown) for further analysis and/or processing (step 370). As discussed above, for the TOF function, the processing step 350 may include using range and TOF information to exclude signal contributions from scattered reflections which fall outside of the selected time gate and would otherwise degrade the image quality. Thus, an image may be produced (at step 370) that is substantially free of the effects of scattering.

In certain examples, the imaging system further includes one or more RGB cameras that may be used to supplement the TOF and/or structured illumination imaging functions. In one example, the one or more RGB cameras may passively image the imaging field (i.e., receiving light from the imaging field, separate from the active illumination performed for the TOF and/or structured illumination imaging functions), including the object 115, to obtain a monochrome or color image of the object (step 330). The imaging system may include a multicolor camera, or may include a set of single-color cameras, the outputs of which may be combined to form an RGB image. In another example, a single camera may be configured to sequentially obtain single-color images, using a serial RGB illumination scheme, for example, and combine those images to produce a color image of the object. Image data from the RGB camera(s) may be processed in the data processing step 350, as shown in FIG. 3. In some examples, the RGB camera(s) may be used to enhance the resolution of the images obtained using the TOF camera. For example, the image frames of the RGB camera(s) may be synchronized with the TOF camera, such that the images from each are captured simultaneously and may be combined using conventional image stacking/stitching processes.

In conventional combined imaging and ranging systems, an infrared (IR) active illumination source and complementary receiver are used. Thus, the IR ranging function does not disrupt or interfere with the visible (e.g., RGB) imaging because the returned IR ranging beam is out of the imaging band of the visible receivers. However, as discussed above, according to certain embodiments, a visible, specifically blue or green, active illumination beam may be used. Without other measures taken, the return beam from the illuminator may overwhelm the RGB camera(s). Accordingly, in certain example, a narrow bandwidth coherent source, such as a DPSS 532 nm laser source, may be used for the illuminator 105, and a matched band-reject filter may be used to block the returned illumination beam from the RGB camera(s). The narrow band should not noticeably distort the image color balance. If any color distortion does arise, the green (or blue) channel of the image may be compensated easily, as will be appreciated by those skilled in the art.

According to some embodiments, the data processing step 350 includes processes for directly measuring the strength of the backscatter signal (320) received from the scattering medium 130. The received signal strength at the camera 120 may provide a measure of both the scattering in the scattering medium and image contrast in the resulting image of the object 115. Thus, unlike conventional TOF systems, where the signal strength is used to improve range information, or as image contrast in direct imaging applications, according to certain aspects, signal strength is collected as a combined measure of both image contrast and scattering strength in the scattering medium 130. This measurement of the strength of the backscatter signal may be used to extract the scattering coefficient of the medium, which may then be used to make corrections to the image of the object 115 and thereby improve the image quality. Thus, the data processing step 350 may include a step 353 of extracting spatial backscatter signatures from a point cloud return signal obtained from the camera (in step 340), and determining the scattering coefficient of the scattering medium 130 (step 352). Once the scattering coefficient(s) have been obtained, they can be used in conjunction with the RGB image data received from the one or more RGB cameras (step 330). For example, the scattering coefficient(s) may be used to correct the RGB image(s) for regional scatter (step 351), thereby providing higher quality, true color images of the object 115. Generally, optical scattering is a function of the wavelength of light being scattered. This is often estimated over the visual/near-infrared wavelengths as a linear or exponential dependency and is typically known for a medium or can be estimated. This difference in scattering can have an effect similar to the color distortion noted from absorption effects. By explicitly measuring the scattering at a reference wavelength, the effect of color distortion from scattering can be estimated. This scattering spectrum may then provide explicit color correction for an object at a known range.

In certain examples, the RGB camera(s) may be used in combination with the structured active illumination discussed above to take a simultaneous visible image of the object 115, which may be overlaid with the range information. In the data processing step 350, the overlaid visible image and range information may be processed using a calibrated diffused illumination "map" (e.g., obtained from the RGB camera) to locate, identify, and produce the image 230 of the object 115. For example, referring to FIG. 3, in using the structured illumination pattern, the processing step 350 may include analyzing the returned structured pattern, and determining range to the object 115 based on distortion and other changes in the reflected illumination pattern relative to the original projected pattern. As discussed above, the structured illumination pattern may include an array of bright dots. Accordingly, the data processing step 350 may include a step 354 of extracting point cloud features from the analyzing the returned array of dots. The range to the object 115 and shape of the object may be determined from analyzing the point cloud features (step 355), as discussed above. The RGB image may then be overlaid with the range and shape information (step 356) to provide a final image that can be displayed or presented to a user or other system for further analysis (step 370). Scattering information may also be extracted by analyzing the returned structured illumination, together with the time of flight information. In one example, extraction of scattering information includes analysis of the convolution of the spatial signal (345) and the TOF camera longitudinal response (steps 351-353). By combining this TOF functionality with the spatial illumination functionality, a more precise depth measurement may be enabled even when the scattering would typically prevent the use of structured illumination.

Thus, according to certain aspects and embodiments, systems and methods for enhanced underwater imaging, particularly in turbid conditions, may be provided using relatively inexpensive components. The systems and methods may similarly be used in other scattering environments. Using a combination of the two imaging modalities discussed above, wherein the TOF camera removes the majority of the backscattering effects and structured illumination is used to provide fine detail, may provide high quality object imaging and distance profiling, not available through conventional systems. TOF source and sensor gating may eliminate the backscatter contribution to the signal, and the finer detail of the object may be profiled using the structured light capability, as discussed above. Combined embodiments may thus provide stand-off range imaging in moderate turbidity, while also providing fine distance resolution (e.g., less than 1 cm). Embodiments of these methods used with the LIDAR system may provide the capability to obtain a color underwater imaging LIDAR system, optionally with a single imaging sensor (camera 120), and may use three-dimensional (3D) LIDAR range parameters that are set from sonar or other external sensor data (step 305). As discussed above, explicit extraction of the scattering coefficient by wavelength may allow for color correction of objects imaging through the scattering medium 130.

According to another embodiment, higher resolution images may be obtained by multiplexing multiple TOF cameras together. The TOF cameras may be clocked using a common (shared) timing signal from the master oscillator, for example, such that the timing information obtained by each camera is synchronized. The image data from each camera may be combined using image stitching processing, as will be appreciated by those skilled in the art. As discussed above, in some embodiments, color imaging may be obtained by combining image data from one or more RGB cameras with the image data from the TOF camera and/or structured illumination receiver. In another embodiment, simultaneous RGB TOF imaging may be obtained through multiplexing three TOF cameras, each appropriately bandpass filtered to receive only a single color, and using a broadband or RGB illumination source 105.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system for marine environments comprising:
   an illuminator configured to produce a structured illumination pattern having a wavelength within the green or blue region of the visible spectrum and to direct the structured illumination pattern into an imaging field;
   a camera configured to receive reflections of the structured illumination pattern from an object in the imaging field, and backscatter from turbid water through which the structured illumination pattern and the reflections of the structured illumination pattern travel, and to provide corresponding image data;
   a master oscillator coupled to the illuminator and to the camera and configured to modulate the structured illumination pattern and to clock the camera so as to time gate the reflections of the structured illumination pattern and provide signal timing data;
   at least one RGB camera configured to image the object and produce an RGB image of the object; and
   a processor coupled to the camera and the RGB camera and configured to receive and process the image data and the signal timing data to produce an image of the object, the processor being configured to:
   measure a signal strength of the backscatter from the turbid water at the wavelength within the green or blue region of the visible spectrum, wherein the signal strength is a combined measure of both a scattering strength of the turbid water and an image contrast,
   extract a scattering coefficient of the turbid water based on analysis of the scattering strength, and
   estimate an effect of color distortion based at least in part on the scattering coefficient of the turbid water at the wavelength within the green or blue region of the visible spectrum, and color correct the RGB image based on the estimated effect of the color distortion.

2. The imaging system of claim 1, wherein the camera includes an array of imaging pixels, each pixel including a photosensitive detector configured to receive the reflections of the structured illumination pattern, and the backscatter from the turbid water, and to produce the image data, and a phase meter coupled to the master oscillator.

3. The imaging system of claim 1, wherein the wavelength within the green region or the blue region of the visible spectrum is a wavelength within the green region of the visible spectrum.

4. The imaging system of claim 1, wherein the structured illumination pattern includes an array of dots.

5. The imaging system of claim 1, wherein the processor is further configured to analyze the image data to obtain an estimated range between the object and the camera, and to overlay the estimated range with the RGB image to produce the image of the object.

6. The imaging system of claim 1, further comprising a narrowband filter coupled to the at least one RGB camera and configured to exclude the reflections of the structured illumination pattern from being received by the at least one RGB camera.

7. The imaging system of claim 1, wherein in imaging the object and producing the RGB image, the at least one RGB camera is configured passively image the object separate from the reflections of the structured illumination pattern received at the camera.

8. The imaging system of claim 7, wherein the at least one RGB camera is configured to image the object simultaneously with the directed structured illumination pattern.

9. A method of imaging an object in turbid water, the method comprising:
   generating a time-modulated structured illumination pattern having a wavelength within the green or blue region of the visible spectrum;
   illuminating the object with the time-modulated structured illumination pattern;
   receiving a reflected signal at an imaging sensor, the reflected signal including reflections of the structured illumination pattern from the object and backscatter from the turbid water;
   collecting spatially resolved range-gated image data by time gating the reflected signal to exclude the backscatter;

producing a passive illumination RGB image of the object using at least one RGB camera;

processing the image data to produce an image of the object including extracting spatial backscatter signatures from the image data and determining a scattering coefficient of the turbid water, wherein extracting the spatial backscatter signatures from the image data includes measuring a signal strength of the backscatter from the turbid water at the wavelength within the green or blue region of the visible spectrum, the signal strength being a combined measure of both a scattering strength of the turbid water and an image contrast; and estimating an effect of color distortion based at least in part on the scattering coefficient of the turbid water at the wavelength within the green or blue region of the visible spectrum, and color correcting the RGB image based on the estimated effect of the color distortion.

10. The method of claim 9, wherein generating the time-modulated structured illumination pattern includes modulating an illumination source using a master oscillator; and wherein time gating the reflected signal includes clocking the imaging sensor using the master oscillator.

11. The method of claim 9, wherein processing the image data includes determining an estimated range to the object and a shape of the object; and further comprising overlaying the estimated range with the RGB image to produce the image of the object.

12. The method of claim 9, further comprising filtering the RGB camera to exclude the reflections of the structured illumination pattern.

13. The method of claim 9, wherein generating the time-modulated structured illumination pattern having a wavelength within the green or blue region of the visible spectrum includes generating the time-modulated structured illumination pattern having a wavelength in the green region of the visible spectrum.

14. The imaging method of claim 9, wherein producing the passive illumination RGB image of the object includes imaging the object separate from the reflections of the structured illumination pattern.

15. The imaging method of claim 14, wherein producing the passive illumination RGB image of the object includes imaging the object, with the RGB camera, simultaneously with illuminating the object with the structured illumination pattern.

* * * * *